T. A. EDISON.
Telephonic Telegraph.
No. 198,088. Patented Dec. 11, 1877.
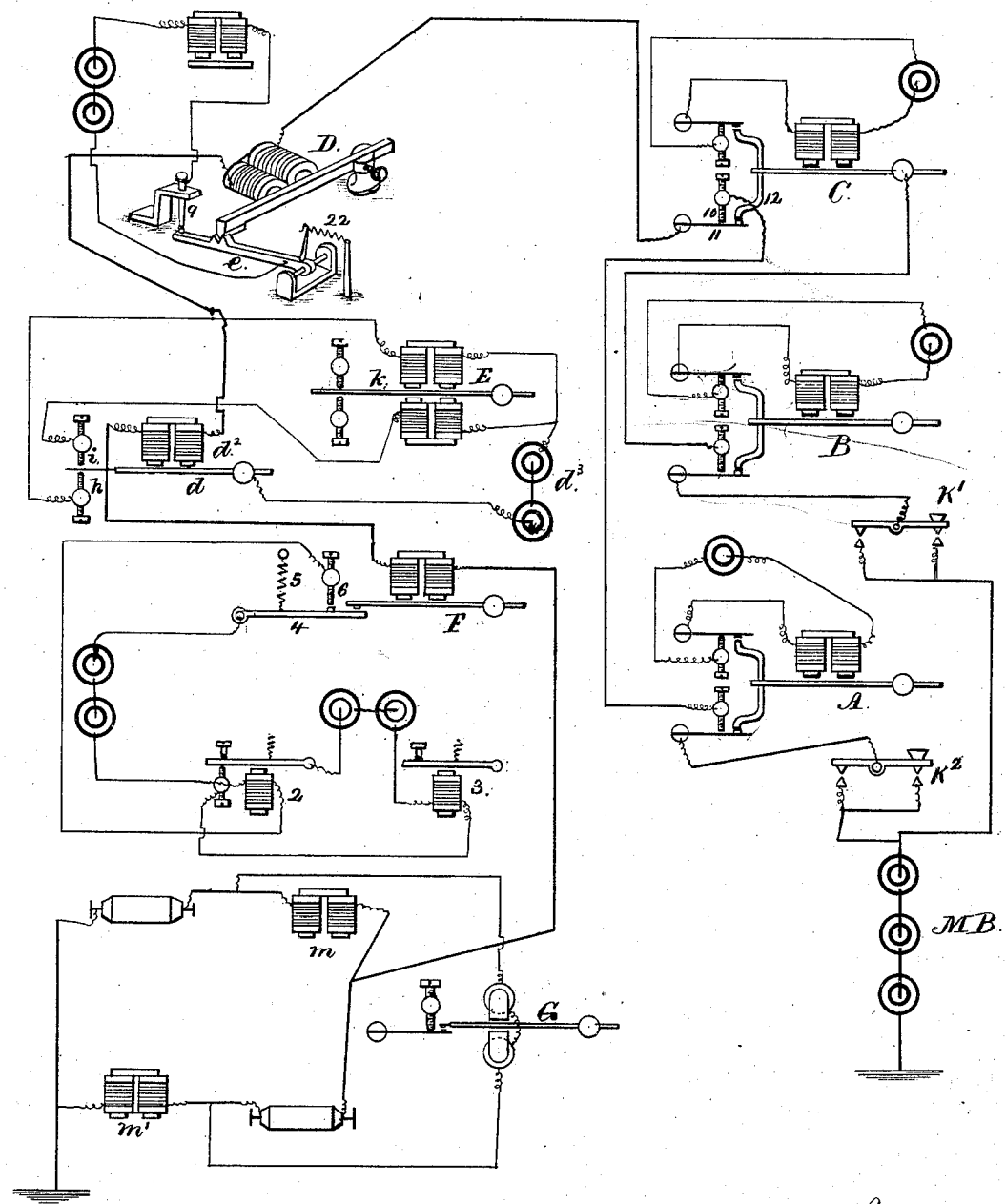

UNITED STATES PATENT OFFICE.

THOMAS A. EDISON, OF NEWARK, NEW JERSEY, ASSIGNOR TO THE WESTERN UNION TELEGRAPH COMPANY.

IMPROVEMENT IN TELEPHONIC TELEGRAPHS.

Specification forming part of Letters Patent No. 198,088, dated December 11, 1877; application filed April 6, 1876.

*To all whom it may concern:*

Be it known that I, THOMAS A. EDISON, of Newark, in the county of Essex and State of New Jersey, have invented an Improvement in Acoustic Telegraphs, of which the following is a specification:

I make use of two or more reeds, vibrating automatically and continuously, preferably by a local-circuit electro-magnet and circuit-breaker operated by the reeds; and these are connected to a circuit-changer placed between them and the main line, and operating to allow the vibrations from only one of the reeds at a time to pass upon the line. This circuit-changer is operated with a speed much greater than that of either of the keys, but at a less speed than either of the transmitting-reeds, so that the pulsations from either of the reeds can be thrown upon the line by the finger-key; but the pulsations from two reeds will not be sent upon the line by the circuit-changer at the same time, so that the pulsations at the distant receiving-station will be more distinct.

A, B, and C are transmitting-reeds. The reed A is placed in one branch leading from the battery M B, while B is placed in another branch. The reed C is in the circuit from the instrument B, between that and the main line.

The reeds A and B transmit waves by just opening the circuit, while the reed C alternately throws the waves from B and A into the main line. Reed C makes but a few vibrations per minute, and it prevents the transmission of both series of waves over the wire at the same time. First, a series of waves is sent from A through 10 and 11; then A is disconnected by 10 and 11 being separated, and a series of waves are sent from B, through C, 12, and 11; but owing to the rapidity with which the two series of waves are alternated into the line by the vibration of the reed C, the break in the continuity of each series is scarcely felt on the receiving-reeds.

It is obvious that several branches might be used, in each of which is placed a reed of different vibrating times, and each reed transmitting waves by simply closing the circuit, (just the opposite to the reeds A and B, which open the circuit,) and a circuit-changing device, operated by C, made to throw in and out of the main circuit each reed in succession, thus preventing the transmitting of but one series of waves over the wire at the same time, and thereby preserving an even adjustment of the receiving-reeds.

It is not necessary that the reed C should always have a constancy of vibrating time, as it is used solely as a circuit-changer; hence an electric engine may be used, its shaft provided with a break-wheel and contact-points, whereby any number of vibrations or waves from different reeds may be allowed to pass into the line.

$K^1$ and $K^2$ are keys used for the purpose of signaling by allowing or preventing the transmission of the waves.

D is a receiving-reed actuated by an electro-magnet, and it is set in motion by waves coming over the wire periodic with its vibrating time.

The extreme end of the reed is provided with a beveled edge, passing into but not touching a V-recess in the local-circuit-closing lever $e$, which lever is provided with a platina point upon its end, which remains in contact with the screw 9, by the action of the spring 22, when the reed is not vibrating; but when the reed commences to vibrate, its beveled end strikes both sides of the V on the lever $e$, and keeps the lever from remaining in contact with 9 long enough to close the local circuit, in which I place a sounder and local battery, in the usual manner.

The object of the double V is to cause the lever to receive a great number of vibrations, and causing the local circuit to be broken a great number of times, thus allowing the use of reeds having a low rate of vibration.

The form of reed shown at E is adapted to vibrate by waves from one of the transmitting-instruments.

The sounder consists of a reed, instead of those constructed in the ordinary manner.

$d$ is the main-line reed, operated by the magnet $d^2$ in the main-line circuit. $h$ and $i$ are two contact-points, one connected to one pair of magnets on the local reed K, and the other point to the other pair of magnets. The other two ends of the magnets are joined together, and connected to a local battery, $d^3$, and thence to the reed $d$.

When no vibrations having a periodic time with $d$ pass over the wire, both $d$ and $k$ remain quiet; but if the operator at the transmitting-station causes the proper waves to be sent, $d$ is set in motion. This reed, making contacts on $i$ and $h$, causes the reed $k$ to vibrate very powerfully, and, hitting its two limiting-screws, makes a sound equal to that of an ordinary sounder.

The advantage of this form of reed is, that it may be worked on very long circuits, and does not require very fine adjustment.

F represents a receiving-reed adapted to the tone and number of vibrations of the transmitting-instruments, and there is a local circuit, in which the lever 4 is kept in contact with its contact-screw 6 by the spring 5 when the reed is not vibrating. This closes the circuit of the repeating-sounder 2, which, in its turn, closes the receiving-sounder 3, the object of the intermediate or repeating sounder being to intercept any false dots, and prevent slight closing of the local from affecting the receiving-sounder 3.

When the proper waves are sent the amplitude of the reed F is sufficient to practically keep the lever 4 away from 6, thus opening both sounders; but if the waves are made to cease, the lever 4 comes in contact with 6, and closes the locals, and indicates the signal given.

G is a polarized reed, provided with a circuit-breaker like F. The reed is permanently magnetized, either by a coil and local battery or in the usual manner, and is adjusted equidistant from the two prongs of the magnet.

When the current passes in one direction through the magnet, one prong has a magnetism the same as that of the reed; hence no attraction takes place, while the other prong will receive a magnetism the opposite that of the reed; hence it will be attracted. If, now, the current be reversed, the opposite action takes place, and the reed is attracted by the other prong. This polarized reed is placed in the bridge-wire of a Wheatstone bridge, formed of two branch wires, each containing a magnet and resistance-coil. When a wave comes over the wire, none of this current passes through the bridge-wire containing G, but, acting on $m'$ and $m$, causes them to set up secondary currents, and these currents, being set up within the bridge-wires, are not in balance; hence they will flow through the bridge-wire and actuate the magnet of G.

The moment the main wave ceases a reverse current from the magnets $m$ $m'$ will be sent through the bridge-wire to G. The magnets $m$ and $m'$ may be replaced by secondary batteries or by shunted condensers, or other devices for generating secondary currents.

I claim as my invention—

1. The combination of several acoustic instruments, each transmitting a different series of waves or impulses, with an automatic circuit-changer, whereby but one series of waves is allowed to pass over the wire at the same time, for the purpose set forth.

2. The combination of an acoustic main-line receiving-instrument, operated by a series of waves within a main circuit of another acoustic instrument, corresponding in its vibrating time, within a local circuit operated by the main-line instrument, substantially as set forth.

3. The combination, with an acoustic receiving-instrument, of a repeating-sounder for intercepting false signals, substantially as set forth.

4. The reed $d$, vibrated by a magnet in the main-line circuit, in combination with the reed $k$, local circuit, magnets, and contact-points $h$ $i$, substantially as set forth.

5. The combination of a polarized acoustic receiving-instrument in the bridge-wire of a Wheatstone balance with induction devices in the line, substantially as and for the purposes set forth.

Signed by me this 3d day of April, A. D. 1876.

THOS. A. EDISON.

Witnesses:
HAROLD SERRELL,
CHAS. H. SMITH.